Aug. 2, 1966 R. J. STAUVERMAN 3,264,518

DIMMER CONTROL CIRCUIT FOR FLUORESCENT LAMP USING
A CONTROLLED RECTIFIER BRIDGE CIRCUIT

Filed June 18, 1962

*INVENTOR.*

RICHARD J. STAUVERMAN

*BY*

Silverman, Mullin & Coan

Attys.

3,264,518
Patented August 2, 1966

3,264,518

DIMMER CONTROL CIRCUIT FOR FLUORESCENT LAMP USING A CONTROLLED RECTIFIER BRIDGE CIRCUIT

Richard J. Stauverman, Evanston, Ill., assignor to Advance Transformer Co., Chicago, Ill., a corporation of Illinois Filed June 18, 1962, Ser. No. 203,039
10 Claims. (Cl. 315—205)

This invention relates to lighting apparatus control circuits. More particularly, in an important aspect, this invention relates to power supply circuits for impressing a controlling direct current on saturable reactor cores which are associated with ballast arrangements for supplying operating potentials to a fluorescent lamp.

As is well known in the art, the fluorescent lamp is a highly efficient lighting apparatus. Efficient as it may be, the fluorescent lamp offers many problems in use. For ignition, the fluorescent lamp requires relatively high potentials because of high impedance. After ignition, this high impedance drops radically and current becomes excessive, and possibly destructive. Accordingly, many ballast circuits have been devised for accomplishing a quick and automatic shift, in impedance. Thus, a given, necessarily high, starting potential is shifted automatically to a low operating potential. This shift is accomplished in accordance with the art by a ballast arrangement connected in circuit with the lamp proper.

The problem of controlling the brightness of such a fluorescent lamp is a very difficult one. With advantage the direct current controlled, saturable reactor has been employed for adjusting the brightness of such a lamp. Thus, coils wound about saturable reactors have been placed in series circuit with the secondary winding of the transformer which supplies alternating current to the lamp from conventional household circuits. By varying the magnetization of these reactors the impedance of the above noted, series connected coils have been varied. Thus, the alternating voltage to the lamp has been varied.

Now all of these noted functions are not necessarily complex, but the performance of these ancillary functions encounters the problem that, in use, the fluorescent light is the primary consideration. Bulky ancillary structures are not convenient to the employment of the fluorescent light in the household or in industrial applications.

Accordingly, it becomes necessary that all these ancillary structures be packaged in a neat, relatively small container and that readily available alternating current be transformed to direct current within this very same container. At the same time this so enclosed structure must be adapted to vary the direct current potential for performing the noted reactance control functions.

Accordingly it is a principal object of the present invention to accomplish the needed conversion of conventionally available alternating current to direct current with a structure of minimum physical dimensions for the specific purpose of operating and controlling the brightness of fluorescent lamps.

It is a further object of the invention to adapt apparatus for accomplishing this conversion function to cooperate advantageously with other apparatus for implementing the fluorescent lighting operation.

It is a still further object of this invention to accomplish simple and readily available control of the potential levels of so converted direct current.

These and other objects are accomplished in accordance with the invention, in one embodiment, with a structure including two variable resistors, each serially arranged in circuit with a storage capacitor across the terminals of a conventional alternating source. Typically, such source may be the readily available 120 volt alternating current source. The aforementioned variable resistor-capacitor combinations are connected in reverse orientation, respectively across the terminals of a two lead connecting line such that one capacitor is connected directly to one lead, the other capacitor is connected directly to the other lead.

From the two common resistor-capacitor connection points of these two resistor-capacitor arrangements, two leads are taken through respectively associated threshold responsive devices. In this one embodiment these devices are, advantageously, four-layer semi-conductor devices. From these devices, leads are taken to the control terminals of two oppositely poled, controllable rectifiers. These well-known, three terminal controllable rectifiers are positioned in respective current paths connected in series opposition across the terminals of the alternating current source.

Poled for series conduction, respectively, with the aforementioned two controllable rectifiers, there are two rectifier diodes oppositely poled and connected across the alternating current terminals.

At a common point between the elements of the above noted two pairs of rectifiers, the controllable rectifiers and the simple rectifiers, two terminals are arranged for connection to a load impedance. Thus, between the two leads of the alternating current supply line, two low impedance paths are alternately presented to the incoming wave. A wave of one polarity passes through one rectifier diode, through the load impedance and through a controlled rectifier. On the next half cycle the alternate rectifier diode defines another path. It is to be noted that these alternate paths presuppose a voltage above a pre-assigned threshold being applied to render the controlled rectifier conductive. By control of the wave level at which these control currents pass to the controlled rectifier, the portion of each wave available to control the saturable reactors is varied.

The load impedance for this so arranged rectifier circuit consists in two serially connected primary windings arranged about saturable reactor cores. These primary windings for these saturable reactor cores are serially connected with the aforementioned load impedance terminals.

The serially connected primary windings are wound and disposed on the respectively associated two cores such that currents flowing in the secondary windings induce opposing potentials in these primary windings. Thus, the so connected, core polarizing, direct current power supply is protected against transient high current surges in the conductive portions of the lighting cycle. Secondary windings on these saturable reactor cores are series connected with those secondary windings which supply operating current to one or more fluorescent lamps from an appropriate transformer of current from a normal electrical power supply. This supply for example, is a normal household electric outlet.

It will be remembered that two variable resistors are connected in series relation with associated storage capacitors in the circuit of the rectifier arrangement in accordance with this embodiment of the invention.

Still further, in this embodiment of the invention, the variable resistor contacts, which control the reactance current flowing through the aforementioned saturable reactors, are arranged to be driven simultaneously by a simple, common connected knob. This knob, with advantage, projects from a unitary control housing. This housing is no more than a box associated with the fluorescent lamp.

Accordingly, it is a feature of the present invention that two ganged variable resistors are connected in reverse orientation in series circuit with two respectively associated capacitors across the terminals of an alternating current source. By varying the value of these resistors, control is exerted on the applied source potential to vary the voltage level at which the threshold responsive devices break down to turn on the controlled rectifiers. Thus, the portion of the alternating supply cycle during which polarizing current passes to the reactor cores is controllably varied. Accordingly the impedance presented to a power supplying circuit for a fluorescent lamp is correspondingly varied.

In accordance with a further feature of this invention, the potential developed across the aforementioned capacitors is supplied to each of two controllable rectifiers for controlling the passage of current therethrough.

It is a further feature of this invention that this control potential is applied to each of the two controllable rectifiers through a threshold responsive device such as a four-zone semiconductor element. Such elements have well-known breakdown characteristics. That is to say, above a certain threshold voltage these four-zone elements exhibit a marked downward change in resistance.

Thus, in accordance with the invention, lightweight and small dimensioned circuits are provided for variably controlling the illuminating power supplied to a fluorescent lamp.

These and other objects, features and advantages of the invention will become apparent from a consideration of the following brief description of illustrative embodiments of the invention shown in the drawings, and from the appended claims.

In these four figures there are delineated aspects of illustrative forms of the invention. In these illustrated embodiments there is seen the variable application of oppositely poled portions of an alternating wave to a pair of threshold responsive devices. Thence, alternate paths are provided for passing power, controlled by wave portions above preassigned thresholds, to a fluorescent lighting load impedance. In this fashion the illuminating level of one or more fluorescent lamps may be controlled by varying the magnetization of a saturable core associated with windings in the power supplying circuit of fluorescent lamps.

Figure 1:
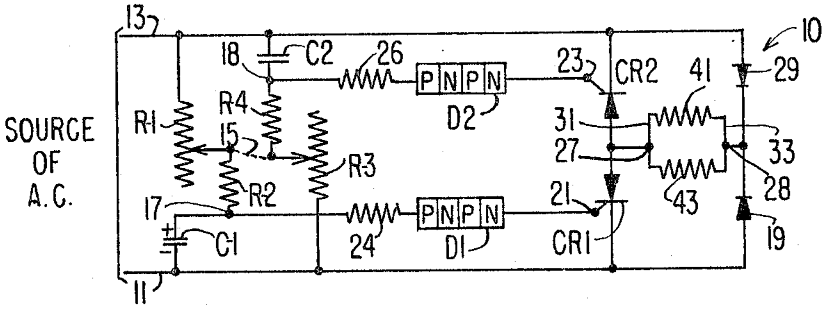
FIG. 1 is a schematic diagram of a variable semiconductor rectifier arrangement for controlling fluorescent lamps in accordance with the invention.

Referring now more particularly to the drawings, in FIG. 1 a rectifier control arrangement 10 in accordance with the invention is illustrated. In this schematic illustration are shown two leads 11 and 13 adapted for connection to a source of 120 volt, 60-cycle current such as is normally available in household appliance outlets. Variable resistors R1 and R3 are arranged for connection across the two leads in reverse orientation through fixed, padding resistors R2 and R4 and through capacitors C1 and C2, respectively.

The first mentioned resistors are variable simultaneously between zero resistance and one megohm under control of a linkage 15 illustrated schematically. Thus, the latter two above mentioned fixed resistors R2 and R4, inter alia, provide a safety pad to avoid possibility of a zero resistance being connected in series with the associated capacitors.

Also connected across these leads are two three-terminal, oppositely poled, controllable rectifier elements CR1 and CR2. Capacitors C1 and C2, respectively, are connected at terminals 17 and 18 to the control terminals 21 and 23 of these controllable rectifiers through four-conductivity zone type semiconductor rectifying elements D1 and D2.

These four-zone semiconductor elements, as is well-known in the art, exhibit the peculiar and advantageous property, of resisting current passage in one condition of applied voltage level. In another condition, a condition in which voltage is applied above a preassigned threshold, these elements are characterized in breaking down for conducting current applied thereto at a substantially constant resistance level. Thus, alternating current is applied across the leads 11 and 13. On each alternate half cycle of the alternating wave, oppositely poled voltages tend to build up across the capacitors C1 and C2 at a rate established by the time constant determined by the serially connected resistors. These so connected resistors include a portion of the variable resistors R1 and R3. Thus a control is exercised on the conduction abilities of the controllable rectifiers by variation of the variable resistors R1 and R3. That is, as the voltage on the representative capacitor C1 builds up to an appropriate threshold level, element D1 breaks down to conduct control current to the controllable rectifier CR1. This control current turns the rectifier CR1 to a conducting, "ON" condition.

The controllable rectifiers have opposed current conduction paths common-connected to a first terminal 27 adapted for connection represented by resistor 41, to a load impedance, by way of lead 31. In a practical situation this resistor 41 represents one, two, or more pairs of saturable reactor control coils associated respectively with controlled fluorescent lamps. This effect becomes clear by considering a typical, specific situation. As the voltage wave on lead 11 swings positively, charge builds up on capacitor C1, appearing at terminal 17 somewhat delayed from the applied voltage on lead 11. As this voltage exceeds the response threshold of the device D1, this device conducts in a low resistance condition with the current being limited by a resistor 24. It is contemplated that where limited voltages are applied to leads 11 and 13, resistors 24 and 26 may not be required. A counterpart limiting resistor 26 is associated with breakdown device D2. Thus the C1 rectifier CR1 is turned on. Once conducting this controlled rectifier remains conducting until reverse voltages are applied between leads 11 and 13. This occurs as the next half of the alternating wave begins.

Rectifiers 19 and 29 are also connected with opposed polarity across the alternating current power leads noted heretofore. These last named rectifiers, which are advantageously, well known semiconductor diodes, are poled for conduction in a low resistance direction toward a common terminal 28. This terminal, in turn, is connected by way of lead 33 to the remaining terminal of the illustrative load impedance, resistor 41.

Connected in parallel with this load impedance is a bleeder resistor 43. This bleeder resistor permits adjustment of the control resistors R1 and R2 and, further, permits adjustment of the control circuit shown in this FIG. 1 in the absence of an actual load impedance connected across the terminals 27 and 28.

From a broad view of this circuit of FIG. 1 it is seen that alternating voltages applied to the leads 11 and 13 tend to charge capacitors C1 and C2. This charging, in the case of capacitor C1, is through variable resistor R1 and resistor R2. As the charge on capacitor C1 reaches an appropriate voltage threshold, the four-zone rectifier element D1 conducts to apply an enabling potential to the control terminal 21 of controllable rectifier CR1. Thus capacitor C1 tends to discharge through a relatively low impedance path, the junction associated with terminal 21 and resistor 24.

Now CR1 conducts and current passes from rectifier 29 and through the controllable rectifier CR1 by way of resistors 41 and 43. Clearly, adjustment of the variable resistor R1 governs the amount of time during an alternating cycle in which C1 will be above the threshold voltage level to enable conduction by the threshold responsive device D1. Conduction by rectifier CR1 will continue, however, until the applied voltage is reversed. Remembering that resistor 41 is illustrative only of one or more pairs of saturable reactor control coils for a fluorescent light load impedance connected across terminals 27 and 28, it is clear that adjustment of the variable resistor governs the fraction of an appropriate voltage wave half cycle during which current is applied to the load impedance through the rectifier CR1.

Similar behavior patterns govern the action of rectifier 19, breakdown element D2, and controllable rectifier CR2. Thus, during adjustable portions of alternate half cycles of the alternating wave which appears across leads 11 and 13, breakdown elements D1 and D2 initiate current pulses of like polarity from terminal 28 to terminal 27. By variation of resistors R1 and R2 the cycle time of initiating these pulses is controlled and so the lamp brightness is varied.

Figure 2:
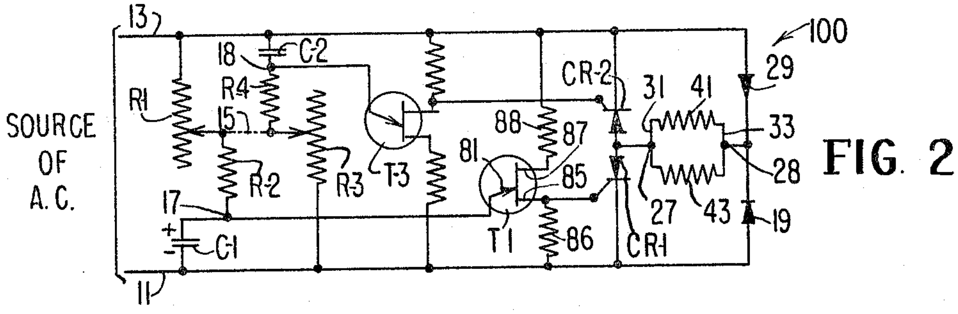
FIG. 2 is a schematic diagram of an alternative control arrangement including threshold responsive unijunction transistor elements in accordance with the invention.

In FIG. 2 there is shown another control circuit 100 illustrating still another feature of the invention. In this FIG. 2 elements corresponding to these of FIG. 1 are similarly numbered. The function of this control circuit illustrated in FIG. 2 corresponds identically to that of FIG. 1 and, consequently very substantial similarity exists among the several elements of the two circuits. Except as noted hereafter the circuit description of FIG. 1 is applicable to that of FIG. 2.

This very important distinction exists. In lieu of the multizone threshold responsive semiconductors D1 and D2 employed in FIG. 1, the control circuit of FIG. 2 employs unijunction transistors T1 and T3. These unijunction transistors perform the threshold response function discussed heretofore in connection with the aforementioned four-zone devices.

Each of these two unijunction transistors performs identical functions in alternation. Each has corresponding circuit elements respectively associated therewith. Therefore, attention is given hereafter only to a single representative one of the two unijunction transistors, transistor T1.

Referring to the discussion of FIG. 1, a threshold voltage response signal is variably established at terminal 17 by adjustment of the one megohm variable resistor R1. From terminal 17 direct connection is made to the emitter electrode 81 of the unijunction transistor T1. The two base electrodes, 85 and 87, of this transistor are connected through respectively associated resistors 86 and 88 across leads 11 and 13.

As voltage builds up on capacitor C1 to a threshold established by known design procedures, transistor T1 conducts. Thus a signal is applied to turn rectifier CR1 "ON."

Current thereafter passes to resistor 41 by way of diode 29. It is to be remembered the rate of voltage build up on capacitor C1 is controlled by adjustment of resistor R1.

A similar but consecutive function is performed by transistor T3. In each case the control signal generated by the unijunction transistor acts to turn on the associated controlled rectifier at a preassigned threshold. The conducting rectifier continues this conduction until the beginning of the next half wave cycle. Then, after the established threshold is reached, the alternate controlled rectifier begins to supply direct current to the load impedance. Thus, variation of resistors R1 and R2 controls the portion of the alternating wave cycle during which direct current is supplied by way of leads 31 and 33.

Figure 3:
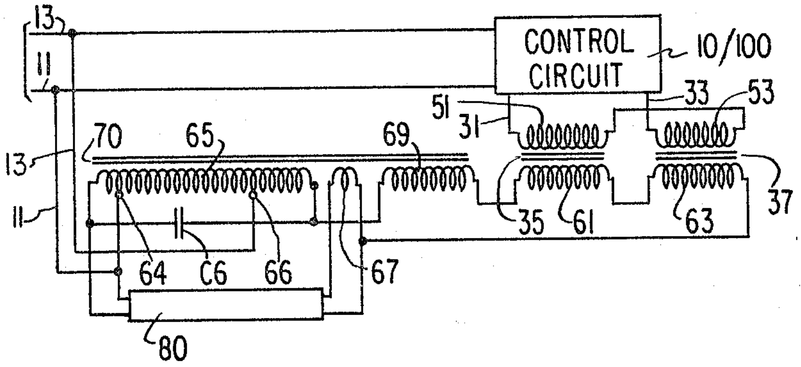
FIG. 3 is a partial schematic block diagram of a circuit advantageously employing the rectifier control arrangement of the type illustrated in FIG. 1 and FIG. 2, in accordance with the invention.

In FIG. 3, there is seen advantageous orientation of the control circuits of FIGS. 1 and 2 in a partial schematic block diagram. The control circuit 10 or 100 is adapted to receive conventional alternating power from a well-known power source, not shown, by way of plug connector and leads 11 and 13. The control circuit 10 or 100, detailed in alternative forms in FIGS. 1 and 2, supplies direct current by way of leads 31 and 33 through primary windings 51 and 53. These windings are serially connected and disposed about saturable reactor cores 35 and 37.

These saturable reactors have associated secondary windings 61 and 63 serially connected with the secondary windings of a well-known ballast arrangement such as, for example, a fluoroescent lamp ballast arrangement of the type disclosed in a patent application of Albert E. Feinberg, Serial No. 159,563, filed December 15, 1961, granted July 6, 1965, as Patent No. 3,193,723. This illustrated ballast arrangement includes an autotransformer having windings 65 and 69, arranged on core 70 for supplying power to a fluoroescent lamp 80. These last enumerated windings are series arranged with the secondary windings 61 and 63 associated with the aforementioned saturable core reactors. Across the winding 65 a power factor capacitor, C6 is connected. Taps 64 and 66 on winding 65 are respectively associated with leads 11 and 13, as shown, thus to energize the transformer core 70, and through this core, the secondary winding 67.

As illustrated, tap 64 supplies power from the autotransformer winding 65 to one end of the fluoroescent lamps 80 and secondary winding 67 energizes the other lamp electrode. Thence, upon starting of the lamp 80, as disclosed in the aforementioned patent of A. E. Feinberg, illuminating power to this lamp is controlled by variation of control linkage 15 associated with the control circuit 10 or 100. It will be recalled that this control 15 is no more than a mechanical linkage well-known in the art for controlling the effective impedance of the resistors R1 and R3, discussed heretofore in connection with FIGS. 1 and 2.

Figure 4:
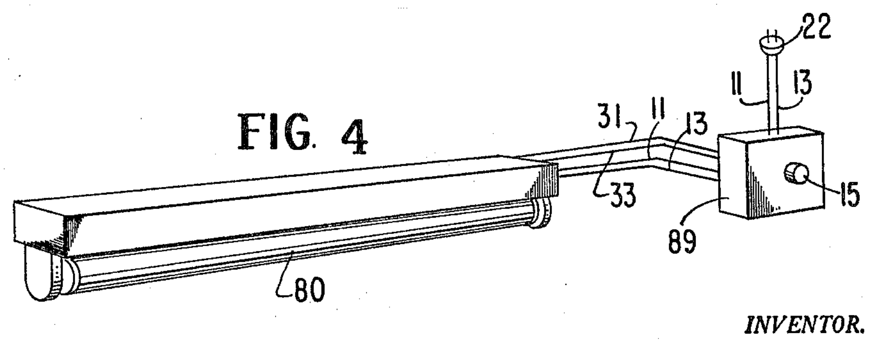
FIG. 4 is a perspective diagrammatic view of a fluorescent lamp and fixture with associated control apparatus in accordance with the invention.

Turning attention next to the structure of FIG. 4, here is seen a diagram of the ballast arrangements of FIGS. 1 or 2 and 3 shown in assembled relation with a single representative fluorescent lamp 80. This lamp may represent one or many of several such lamps which may be controlled by the structures in accordance with the invention. It will be observed that only a single control knob 15 projects from control box 89 and a single pair of leads 11 and 13 extend from the control box. These leads are adapted for connection to a conventional household electric outlet by the plug 22.

Thus, in accordance with the invention, there is supplied means for readily and economically controlling the illumination power supplied to the fluorescent lamp. Thus the brightness of the lamp is varied. All controls are conveniently contained within a box of convenient size, and are operated by a single knob.

What it is desired to claim by Letters Patent in the United States is:

1. Control apparatus for applying variable operating potentials to a fluorescent lamp which comprises first and second lead means for supplying energizing power to a winding of an auto transformer adapted and connected for supplying said operating potentials to said lamp, first and second saturable reactance transformer core members each having a secondary winding connected in series circuit with said lamp and said autotransformer winding, first and second primary windings for said first and second transformer core members, respectively, said last named windings being connected in opposed magnetizing relation and in series circuit with a control circuit having first and second output terminals, said control circuit comprising, first and second oppositely-poled rectifying elements connected across said power supplying lead means and being respectively poled for current conduction in a low resistance direction from a connected one of said lead means to said first output terminal, first and second, three-terminal controllable rectifier elements each having first and second conduction terminals connected in series conduction circuit with said rectifier elements, respectively, said three-terminal rectifier elements having one current conduction terminal connected in common to a second control circuit output terminal adapted for connection in series circuit with said variable reactance primary windings, first and second variable resistors, first and second capacitors connected across said first and second lead means by way of respectively associated ones of said variable resistors in reverse orientation, means for connecting a common terminal of said first capacitor and said first resistor in controlling relation to a control terminal of said first controllable rectifying element, second means for connecting a common terminal of said second capacitor and said second variable resistor in controlling relation with a control terminal of said second controllable rectifier element, and means for varying the resistance of said variable resistors, whereby illumination potentials applied to said fluoroescent lighting element from said first transformer secondary winding are variable for dimming or brightening said fluorescent lighting element upon variation of said variable resistors.

2. Apparatus as set forth in claim 1 wherein said first and second connecting means comprise a first and second four semiconductor zone, threshold responsive device.

3. Apparatus as set forth in claim 1 wherein said first and second connecting means, respectively, comprise a unijunction transistor, each of said unijunction transistors having two conduction terminals and respectively associated resistor means for connecting each of said two terminals to a different one of said first and second lead means.

4. Apparatus as set forth in claim 3 wherein a control emitter terminal of each of said unijunction transistors is connected directly to one of said input lead means by way of one of said capacitors.

5. Apparatus as set forth in claim 1 wherein first and second padding resistors are respectively connected in series relation between said variable resistors and said capacitor elements.

6. Apparatus as set forth in claim 5 and in combination therewith a bleeder resistor connected across said output terminals.

7. Apparatus for converting alternating current to an adjustable direct current and applying same to saturable core reactor means for dimming a fluorescent ballast device and the saturable core reactor means adapted to be connected to said ballast device, which comprises first and second output terminals adapted for supplying direct current to said reactor means, first and second input leads adapted for receiving power from an alternating source, first and second rectifier elements connected and poled for conducting current, respectively, to said first output terminal from said input leads, first and second three electrode, controllable rectifier elements each comprising a control electrode and a rectifying current conduction path defined by two conduction electrodes, said first and second current conduction paths being connected and poled for conduction in serial relation from said second output terminal, respectively, through said first and second rectifier elements, first and second variable resistors, first and second capacitors, said variable resistors and said capacitors being, respectively, series connected in reverse orientation across said input leads, and first and second coupling means respectively establishing paths from the capacitor terminals associated with said variable resistors to said first and second rectifier element control electrodes.

8. Apparatus as set forth in claim 7 and, in combination therewith, first and second fixed resistors respectively interconnecting said last named capacitors and variable resistors.

9. Apparatus as set forth in claim 7 wherein said coupling means respectively comprise first and second threshold, responsive elements for respectively coupling said last named capacitor terminals to said control electrodes.

10. Apparatus as set forth in claim 9 and, in combination therewith, means for simultaneously varying said variable resistors.

References Cited by the Examiner

UNITED STATES PATENTS

| | | | |
|---|---|---|---|
| 2,961,579 | 11/1960 | Roney et al. | 315—100 |
| 3,047,789 | 7/1962 | Lowry | 307—88.5 |

OTHER REFERENCES

Applications and Circuit Design Notes, Bulletin D420-02-59, August 1959, page 9, Solid States Producers, Inc., Salem, Mass.

"Controlled Rectifier Manual, First Edition pages 94, 95, General Electric Co., Auburn, New York.

DAVID J. GALVIN, *Primary Examiner.*

GEORGE N. WESTBY, *Examiner.*

C. R. CAMPBELL, *Assistant Examiner.*